United States Patent [19]

Perry et al.

[11] Patent Number: 4,678,532
[45] Date of Patent: Jul. 7, 1987

[54] TREATMENT OF WOOD VENEERS IN PLYWOOD MANUFACTURING

[75] Inventors: David A. Perry; Richard D. Stratton, both of Pineville, La.

[73] Assignee: Perkins Industries, Inc., Overland Park, Kans.

[21] Appl. No.: 714,437

[22] Filed: Mar. 21, 1985

[51] Int. Cl.⁴ .............................................. C09J 5/04
[52] U.S. Cl. ..................................... 156/314; 144/348; 144/352; 156/315; 156/316; 156/319; 427/325; 427/408
[58] Field of Search ............... 156/314, 316, 315, 319; 427/325, 408; 144/348, 352

[56] References Cited

U.S. PATENT DOCUMENTS

| | | | |
|---|---|---|---|
| 2,851,730 | 9/1958 | Wilhelmi et al. | 156/315 |
| 3,697,355 | 10/1972 | Black | 156/319 |
| 3,788,929 | 1/1974 | Huttunen | 156/314 |
| 4,186,242 | 1/1980 | Holmquist | 427/325 |

Primary Examiner—John J. Gallagher
Attorney, Agent, or Firm—Kokjer, Kircher, Bradley, Wharton, Bowman & Johnson

[57] ABSTRACT

A method of pretreating wood veneers with a wetting agent which reduces the amount of adhesive required to bond the veneers together in plywood manufacturing. The wetting agent can be water or a liquid solution containing an elastomer or plasticizer which leaves a thin film of solids on the veneer surface after it evaporates. The wetting agent is in part absorbed by the veneer to inhibit absorption of liquid from the adhesive. Also, the solid film left on the veneer flows on the glue line and wets the adhesive when the veneer is hot pressed. This promotes flow and spreading of the adhesive, even if it is partially dry, and thus results in more effective use of the adhesive so that the adhesive usage is reduced.

14 Claims, No Drawings

TREATMENT OF WOOD VENEERS IN PLYWOOD MANUFACTURING

BACKGROUND OF THE INVENTION

This invention relates in general to the production of plywood and more particularly to a method of treating wood veneer in a manner to reduce the amount of adhesive needed to bond the veneer into plywood.

In the production of plywood, the wood veneers are dried, coated with a suitable adhesive assembled and hot pressed into plywood panels. Because the adhesive cost is a major factor in the overall cost of the plywood manufacturing operation, attempts have been made to reduce the adhesive usage as much as possible. Many of these attempts have involved the formulation of different types of adhesives and various additives which are intended to enhance the flow characteristics and/or the bonding properties. However, the different adhesive formulations that have been proposed are for the most part no better than the traditional phenolic, urea and various adhesives that have long been used, generally due to problems relating to cost, cure speed, bonding qualities handling difficulties and other factors.

One of the major contributing factors to excess adhesive usage is the tendency for significant portions of the adhesive to dry out prior to hot pressing of the plywood. A number of reasons exist for the dried glue lines, including low adhesive spreads, long assembly times, low moisture content veneers, excessive veneer temperature and excessive precure time before the hot press is closed. Whatever the reason, compensation for dried glue must be made by adding more glue, and the adhesive requirements are increased accordingly.

SUMMARY OF THE INVENTION

The present invention is directed to a method of pretreating wood veneer in a manner to reduce the amount of adhesive that is required to bond the veneer into plywood. In accordance with the invention, liquid is fogged or sprayed onto the veneer after it has been dried. The liquid may or may not contain an elastomer or wood plasticizer. Approximately two to eight pounds of liquid is applied per thousand square feet of veneer surface depending on factors such as veneer temperature, moisture content etc. The veneer is then allowed to stand for a time period of a few seconds to several hours prior to applying a conventional adhesive normally used in plywood manufacture.

The amount of conventional adhesive applied is in a lesser quantity than is normal (56-64 pounds per thousand square feet double glue line as compared to the usual 78-82 pounds per thousand square feet double glue line). The veneers are then assembled and hot pressed into plywood following normal practices.

The effect of the pretreatment of the veneers with liquid is three-fold: (1) the liquid which is absorbed by the veneer inhibits absorption of liquid from the adhesive thereby reducing drying or loss of moisture from the adhesive; (2) the veneer is cooled by evaporation thereby reducing adhesive absorption; and (3) the elastomer or plasticizer which is deposited on the veneer surface allows better adhesive flow when heat and pressure are applied, thereby rewetting the adhesive and promoting its flow even if some of the adhesive has dried prior to hot pressing. As a result of these three beneficial effects, the adhesive usage can be reduced by 20%-25% without adversely affecting the glue bond.

DETAILED DESCRIPTION OF THE INVENTION

In accordance with the present invention, sheets of wood veneer that are to be made into plywood are dried in the usual manner and then treated with a wetting agent which serves to reduce the amount of adhesive that is normally necessary to bond the veneer sheets into plywood panels. The wetting agent that is used in the pretreatment of the veneer should be either water or a liquid solution which includes a small amount of an elastomer or plasticizer. It has been found that water provides acceptable results when used alone as the wetting agent. Other liquids that have been even more effective are a wax emulsion solution of water from 1% to 50% solids and an ammonium lignosulfonate solution of water from 1% to 25% by weight ammonium lignosulfonate. Suitable additives can be used in varying amounts in any of the solutions.

The amount of the liquid applied to the veneer varies considerably depending upon factors such as the moisture content of the veneer prior to treatment and other variables commonly encountered in normal plywood manufacturing operations, such as veneer temperature, total assembly time, including the stand time before hot pressing, and the adhesive that is used. Generally, between two and eight pounds of liquid should be used per thousand square feet of veneer surface. In most cases, two to six pounds per thousand square feet is effective. The liquid is preferably fogged or sprayed onto the veneer surfaces, although it can be applied in virtually any desired manner so long as the application is relatively uniform.

The veneer sheets should be thoroughly dried by conventional processes to remove all free water and most of the bound water before the pretreatment begins. After the treatment liquid has been applied, the veneers should be allowed to stand for sufficient time to allow the liquid to evaporate (and to be absorbed in part by the veneer). This can take from a few seconds to several hours, again depending on various factors that differ from case to case. Part of the treatment liquid is absorbed by the veneer and the remainder evaporates, leaving the elastomer or plasticizer in the solution on the surface of the veneer in a thin film.

A suitable adhesive such as a phenolic, urea, melamine or variations thereof is coated on the surfaces of the veneers that are to be bonded together in the plywood. The amount of adhesive that is applied to the veneer is reduced appreciably in comparison to the amount used in conventional plywood manufacturing. In the past, due in large part to the fact that a significant portion of the glue dries out prior to hot pressing, it has been necessary to use approximately 78 to 82 pounds of adhesive per thousand square feet of double glue line. In the present invention, the pretreatment of the veneer with liquid reduces the adhesive requirements for reasons that will be given. Between 56 and 64 pounds of adhesive are applied per thousand square feet of double glue line in accordance with the present invention. This amounts in most cases to a reduction of approximately 20 to 25% in the adhesive usage with no sacrifice in the strength of the glue bond.

After the adhesive has been applied to the veneer surfaces, they are assembled and inserted into a hot press which applies heat and pressure to the assembled veneers for sufficient time to produce a satisfactory bond. After pressing, the plywood is trimmed and further processed in accordance with conventional practice.

Because of the time required to assemble the veneers, along with manufacturing variables, significant amounts of adhesive can dry out and thus flow poorly or not at all during the hot pressing operation of veneers that are not pretreated. This has resulted in excessive adhesive usage in conventional plywood manufacturing because added glue must be used to compensate for the glue that dries out prior to hot pressing.

The pretreatment carried out according to the present invention is effective in reducing the amount of adhesive that is required to bond the veneers together. Although the chemical and physical processes that occur are not fully understood, it is believed that the pretreatment of the veneers with liquid contributes to good adhesive flow in three respects. First, some of the wetting agent used in the treatment is absorbed by the veneer, and less liquid is absorbed from the adhesive than would otherwise be the case. This phenomenon inhibits drying of the adhesive and results in a reduction in the amount of adhesive that dries out prior to hot pressing and is thus rendered essentially useless as a bonding agent for the veneer. Because of this factor, ordinary tap water can be used effectively as the wetting agent.

The second beneficial aspect of the treatment is that the evaporation of the liquid cools the veneer thereby retarding the absorption of the adhesive.

Another contribution that the wetting agent makes to the promotion of adhesive flow is more subtle and results from the thin film of elastomer or plasticizer that remains on the veneer surface after the wetting agent has evaporated or has been absorbed. The adhesive which is coated on the surfaces of the veneer is applied to this film (which may be in the form of minerals, wax particles or other particles, depending upon the elastomer or plasticizer that is used). When the veneers are hot pressed, the heat and pressure are applied to the film of elastomer or plasticizer, and the solids are thus caused to flow on the glue line. This flowing of the solids promotes flowing of the adhesive as well, and it also serves to wet the glue line and the veneer surfaces. Consequently, even if some of the adhesive dries out during assembly prior to hot pressing, it is re-wetted by the flowing film of the elastomer or plasticizer used, and flow of the adhesive is thereby promoted. The result is that the adhesive spread is enhanced and only a minimal amount, if any, of the adhesive is lost due to drying.

Exemplifying the foregoing, a wetting agent comprising a wax emulsion can be prepared by diluting a wax emulsion solution to a final solids content of between 1% and 50% with the remainder being essentially water. Small amounts of a preservative and a stabilizer (such as ammonium lignosulfonate) are preferably added to the solution. Homogenization may be effected in any suitable manner.

The wax emulsion can be applied to dry veneers by fogging or spraying at a rate of 2 to 6 pounds of wax emulsion per thousand square feet of veneer surface. Following application of the wax emulsion, the veneers are allowed to stand or immediately coated with a suitable adhesive. The liquid from the solution is in part absorbed by the veneer and in part evaporates, leaving most of the wax solids on the veneer surfaces in a thin film.

The adhesive is coated on the veneer surfaces at a rate of 56 to 64 pounds per thousand square feet double glue line. Following application of the adhesive, the veneers are assembled following normal plywood practices and are placed in a hot press which applies heat and pressure sufficient to bond the veneers together in a plywood panel. The heat and compression applied during the hot pressing operation melts the wax and causes it to flow along the glue line, thus wetting the adhesive and veneer surfaces and initiating better flow of the adhesive even if some of it is dry. This enhanced spreading and flow of the adhesive results from its having been re-wetted by the now melted wax particles. When this enhanced adhesive spreading is combined with the reduction in drying of the adhesive due to the presence of wetting agent absorbed in the veneer, the overall result is that the adhesive is used more effectively because less is wasted due to dried glue lines and also because it flows better. Consequently, the amount of adhesive required to obtain the necessary bond in the plywood is reduced significantly from the amount required in the absence of pretreatment.

As indicated previously, the pretreatment process of the present invention allows the adhesive usage to be reduced by about 20%–25% in most cases without any sacrifice in the strength of the glue bond. By using 2–6 pounds of wetting agent per thousand square feet, the adhesive usage is typically reduced by about 20 pounds per thousand square feet double glue line. Thus, 20 pounds of relatively expensive adhesive can be replaced by 2–6 pounds of much less expensive wetting agent (which is largely or entirely water). The economic consequences are substantial in that an average size plywood plant producing 180 MM Ft$^2$ ($\frac{3}{8}$ basis) can save well over $300,000 per year in adhesive costs while requiring only a fraction of this amount in the cost of wetting agent and application equipment.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A method of treating wood veneer in the manufacture of plywood to reduce the amount of adhesive required in the plywood, said method comprising the steps of:
   drying the veneer;
   applying to the veneer a wetting agent that is comprised of water;
   allowing the veneer to stand for a preselected time period sufficient to permit the water to evaporate and be absorbed by the veneer,
   applying adhesive to the veneer surface after elapse of said time period in an amount related to the water absorbed by the veneer; and
   applying heat and pressure to the veneer to form plywood.

2. The method of claim 1, wherein the wetting agent is applied in an amount in the approximate range of one to eight pounds of wetting agent per thousand square feet of veneer surface.

3. The method of claim 2, wherein the adhesive is applied in an amount in the range of approximately 56 to 64 pounds per thousand square feet double glue line.

4. The method of claim 1, wherein said preselected time period is in the range of approximately a few seconds to several hours.

5. The method of claim 1, wherein the wetting agent includes a wax emulsion.

6. The method of claim 5, wherein wax is present in said emulsion in the approximate range of 1% to 50% on a weight basis.

7. The method of claim 1, wherein the wetting agent is a solution of ammonium lignosulfonate and water.

8. A method of manufacturing plywood from sheets of wood veneer and adhesive, said method comprising the steps of:
   drying the sheets;
   applying to the surfaces of the sheets a wetting agent comprising liquid and a small quantity of flowable solids, said wetting agent being applied in an amount in the range of approximately one to eight pounds per thousand square feet of veneer surface;
   following elapse of sufficient time for the liquid of the wetting agent to evaporate and be absorbed by the sheets, coating the surfaces of the veneer sheets with the adhesive applied in an amount related to the liquid absorbed by the sheets and in the range of approximately 56 to 64 pounds per thousand square feet double glue line;
   assembling the sheets of veneer into a panel; and
   applying heat and pressure to the veneer sheets, said heat and pressure causing the solids left on the veneer to flow thereon to effect wetting of the adhesive for enhance flow of the adhesive between the veneer sheets.

9. The method of claim 8, wherein the wetting agent is a wax emulsion.

10. The method of claim 8, wherein the wetting agent is a solution of ammonium lignosulfonate and water.

11. In a plywood manufacturing process, the steps of:
   drying sheets of wood veneer;
   applying to the surfaces of the veneer a wetting agent consisting essentially of water and elastomer which in part evaporates and is in part absorbed by the veneer;
   allowing the veneer to stand for a time period sufficient for the wetting agent to evaporate and be absorbed by the veneer;
   applying adhesive to the veneer in an amount related to the wetting agent absorbed by the veneer after elapse of said time period;
   assembling the sheets of veneer into a panel;
   applying heat and pressure to the panel, whereby the adhesive is wetted by the wetting agent absorbed in the veneer and flowing of the adhesive is thereby promoted; and
   wherein said wetting agent consists of water and elastomer.

12. The invention of claim 11, wherein said wetting agent is applied in an amount in the approximate range of 1 to 8 pounds per thousand square feet of veneer surface.

13. The invention of claim 12, wherein the adhesive is applied in an amount in the approximate range of 56 to 64 pounds per thousand square feet double glue line.

14. In a plywood manufacturing process, the steps of:
   drying sheets of wood veneer;
   applying to the surfaces of the veneer a wetting agent consisting essentially of water and wood plasticizer which in part evaporates and is in part absorbed by the veneer;
   allowing the veneer to stand for a time period sufficient for the wetting agent to evaporate and be absorbed by the veneer;
   applying adhesive to the veneer in an amount related to the wetting agent absorbed by the veneer after elapse of said time period;
   assembling the sheets of veneer into a panel;
   applying heat and pressure to the panel, whereby the adhesive is wetted by the wetting agent absorbed in the veneer and flowing of the adhesive is thereby promoted; and
   wherein said wetting agent consists of water and elastomer.

* * * * *